Feb. 12, 1952     J. MAKHONINE     2,585,480
DEVICE FOR CHANGING THE LOADING OF AIRCRAFT WINGS
Filed July 1, 1947

INVENTOR
JEAN MAKHONINE
BY
Robert E Burns
ATTORNEY

Patented Feb. 12, 1952

2,585,480

UNITED STATES PATENT OFFICE 2,585,480

DEVICE FOR CHANGING THE LOADING OF AIRCRAFT WINGS

Jean Makhonine, Paris, France

Application July 1, 1947, Serial No. 758,420
In France July 2, 1946

1 Claim. (Cl. 244—93)

It is a known fact that for reducing the bending stresses acting on aircraft wings during flight, it is of advantage to provide loads at certain points of the span of said wings. Such loads acting as relieving means during flight increase, on the contrary, the bending of the wing at the time of landing and taking off when the weight and acceleration of the craft are taken up entirely, or partly through the reactions of the landing gear. Obviously the action of the masses arranged inside the wing is all the more important when the values of said masses are higher and their leverages with reference to the securing point for the landing gear are more considerable.

The invention forming the object of the present application consists chiefly in providing the wings with one or more counterweights adapted to move along the span. These counterweights will be shifted towards the outer ends of the wings during normal flight and towards the plane of symmetry of the aircraft in the case of landing or taking off. The masses of such counterweights are constituted preferably by useful loads such as fuel. Their displacements may be ensured either mechanically or through pipes in the case of liquid masses. These masses may be located inside or outside the wings.

My invention is illustrated diagrammatically in perspective view in accompanying drawings.

Figure 1:
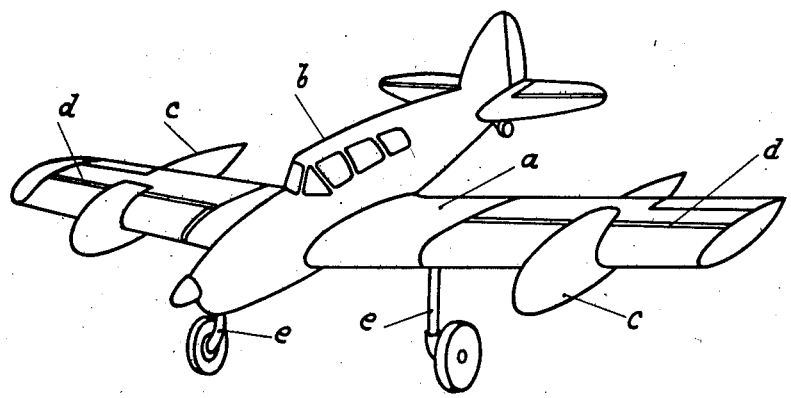
Figure 2:
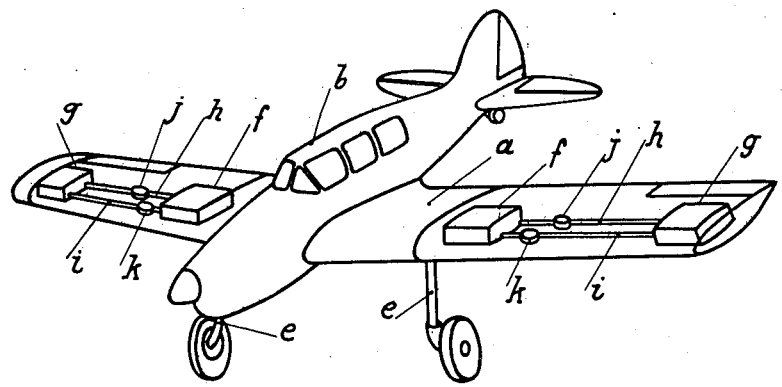

Figs. 1 and 2 illustrate two modifications thereof.

In the embodiment of Fig. 1 the wing $a$ secured to the central fuselage $b$ is provided with two fairings $c$ that are adapted to slide spanwise over the race D. There may be provided suitable tackle, for example of the "wash-line" type, for effecting the positional shifting of the fairings $c$. During flight, these fairings will be displaced towards the outer ends of the wing and their weight and that of the loads contained therein will reduce the bending stresses. When landing and taking off, the fairings $c$ should be shifted into register with the points at which the landing gear $e$ is secured to the wing in order to reduce the reverse bending action produced by the inertia stresses due to the overhanging weight of the wings.

In the modification illustrated in Fig. 2, the wing $a$ secured to the central fuselage $b$ is provided with two inner reservoirs $f$, located in front of the landing gear $e$, and $g$ located adjacent to the marginal ends of the wing. The reservoirs in each wing are connected through pipes $h$ and $i$ in which are inserted pumps $j$ and $k$.

After taking off, the pumps $j$ pump fuel out of the reservoirs $f$ and transfer it through the pipes $h$ into the reservoirs $g$ that were empty during the running of the aircraft over ground. Conversely the liquid contained inside the reservoirs $g$ is again transferred into the reservoirs $f$ through the pumps $k$ and the pipes $i$ when landing.

What I claim is:

In an air craft, the combination of wings, a first reservoir carried by each wing adjacent the longitudinal axis of the craft, a second reservoir positioned adjacent the outer ends of each wing, conduit means connecting each outer reservoir with the inner reservoir of the same wing, said conduit means being adapted to carry liquid from one of said reservoirs to the other of said reservoirs, and pumping means in each of said conduit means, said pumping means being simultaneously actuatable to transfer equal quantities of liquid from said inner reservoirs to said outer reservoirs and from said outer reservoirs to said inner reservoirs whereby to effect symmetrical displacement of weight along said wings.

JEAN MAKHONINE.

REFERENCES CITED

The following references are of record in the file of this patent:

UNITED STATES PATENTS

| Number | Name | Date |
|---|---|---|
| 2,076,090 | Myers | Apr. 6, 1937 |
| 2,343,638 | Bock | Mar. 7, 1944 |
| 2,356,786 | Harman et al. | Aug. 29, 1944 |

FOREIGN PATENTS

| Number | Country | Date |
|---|---|---|
| 449,381 | France | Dec. 21, 1912 |